(12) United States Patent
Chumley

(10) Patent No.: US 8,991,897 B2
(45) Date of Patent: Mar. 31, 2015

(54) PROTECTIVE COVER SYSTEM FOR TRAILER

(71) Applicant: Kenneth D. Chumley, Woodruff, SC (US)

(72) Inventor: Kenneth D. Chumley, Woodruff, SC (US)

(*) Notice: Subject to any disclaimer, the term of this patent is extended or adjusted under 35 U.S.C. 154(b) by 89 days.

(21) Appl. No.: 13/674,338

(22) Filed: Nov. 12, 2012

(65) Prior Publication Data

US 2014/0132027 A1    May 15, 2014

(51) Int. Cl.
*B60J 11/06* (2006.01)

(52) U.S. Cl.
CPC ........................................ *B60J 11/06* (2013.01)
USPC ........................ 296/136.08; 150/166; 280/770

(58) Field of Classification Search
CPC .............. B60J 11/06; B60J 7/102; B60J 7/10; B62D 35/004; B60P 3/343
USPC ................. 296/77.1, 83, 1.07, 136.1, 136.11, 296/107.12, 136.01, 136.07, 100.11, 296/100.13, 100.15, 100.16, 136.08; 150/166; 280/770
See application file for complete search history.

(56) References Cited

U.S. PATENT DOCUMENTS

| 3,324,869 | A | * | 6/1967 | Duda ......................... 135/88.12 |
| 3,912,323 | A |   | 10/1975 | Dancik |
| 4,030,779 | A | * | 6/1977 | Johnson ..................... 296/180.4 |
| 4,088,362 | A |   | 5/1978 | Mollura |
| 4,427,229 | A | * | 1/1984 | Johnson ..................... 296/180.4 |
| 4,553,781 | A | * | 11/1985 | Johnson ......................... 254/327 |
| 4,702,509 | A |   | 10/1987 | Elliott, Sr |
| 4,706,991 | A |   | 11/1987 | Miller |
| D315,707  | S |   | 3/1991 | Reiser |
| 5,180,205 | A |   | 1/1993 | Shoop |
| 5,332,280 | A |   | 7/1994 | DuPont |
| 5,487,586 | A |   | 1/1996 | Kinkaide |
| 6,685,251 | B2 | * | 2/2004 | Dumas ..................... 296/100.01 |
| 7,234,760 | B1 |   | 6/2007 | Crean |
| 7,255,386 | B1 |   | 8/2007 | Perniciaro |
| 7,337,504 | B1 | * | 3/2008 | Casey .......................... 24/134 P |
| 2002/0171259 | A1 | * | 11/2002 | Reich ............................. 296/136 |
| 2003/0205892 | A1 | * | 11/2003 | Andrews ...................... 280/770 |
| 2008/0164713 | A1 |   | 7/2008 | Saurman et al. |

FOREIGN PATENT DOCUMENTS

GB    2 096 549 A    10/1982

* cited by examiner

*Primary Examiner* — Jason S Morrow
*Assistant Examiner* — E Turner Hicks
(74) *Attorney, Agent, or Firm* — Neal P Pierotti; Metz Lewis Brodman Must O'Keefe

(57) ABSTRACT

A protective cover system for a trailer is provided that includes a cover and a line. The line moves relative to the trailer for moving the cover from a lowered position to a raised position. A portion of the line may be located outboard from a side surface of the trailer in a lateral direction and may be located rearward of a front surface of the trailer in a longitudinal direction.

20 Claims, 12 Drawing Sheets

US 8,991,897 B2

PROTECTIVE COVER SYSTEM FOR TRAILER

FIELD OF THE INVENTION

The present invention relates generally to a protective cover system for a trailer such as a fifth wheel camper that is hauled behind a vehicle. More particularly, the present application involves a protective cover system with a cover that can be raised and lowered with respect to a front surface of the trailer and that is removable and easily washable.

BACKGROUND

Trailers, such as fifth wheel trailers, are used for utility and recreational activities. For example, camping trailers are transported by a family via their truck or car to a campsite where they are subsequently used for sleeping, cooking, or storage purposes. During transport, trailers are of a height that may be higher than that of the pulling vehicle. Further, the front surface of trailers can be set some distance behind the pulling vehicle. The arrangement of trailers with respect to their pulling vehicle causes the front surface of the trailer to come into contact with wind, bugs, and debris that can strike or damage the front surface.

Bug and debris impact onto the front surface of the trailer during transport may result in an undesirable appearance of the trailer once located at the campsite. Upon setting up the trailer at the campsite, the family will have to look at the dirty, damaged front surface of the trailer the entire time they are camping. Once finished, the front surface of the trailer will become even more dirty and damaged upon transport back from the campsite to the family's home. The family may be too tired after their camping trip to want to clean and/or repair the front surface of the trailer after getting home. This may result in permanent damage or discoloration to the front surface aside from causing it to be unsightly for an extended period of time. Further, there is a large amount of effort needed to clean the front surface of the trailer due to its height and due to the material and shape making up this portion of the trailer.

One device for preventing damage to a front surface of a trailer is known as a bug bra that is used to prevent impact of this area of the trailer from insects and dirt. The bra is made of vinyl fabric and is attached via mechanical fasteners to trim located on the side of the trailer and along the upper surface of the trailer. Although capable of preventing damage to a trailer surface, the bug bra is difficult to install because the user must access the upper surface of the trailer which may require a ladder or other device. Further, placement of the bug bra on the surface of the trailer will itself leave a mark as it is not easily removable from the surface.

A different device known for use with a trailer involves an inflatable body that is located on the front surface of the trailer for aerodynamic advantage to reduce wind resistance to the trailer and improve fuel economy. This arrangement requires a pair of mounting poles that are vertically oriented to prevent lateral movement of the inflatable body. A single pulley system is used to pull the inflatable body into position on the trailer that includes a line that extends across the entire lateral length of the inflatable body and a winch that is used to draw this line. Although capable of improving aerodynamic properties of the trailer, the inflatable body is not designed for reducing impacts to the front surface of the trailer and is not easily removable or washable. Further, the hoisting mechanism is complex in nature and requires components only on the front surface of the trailer thus limiting its functionality and performance. As such, there remains room for variation and improvement in the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
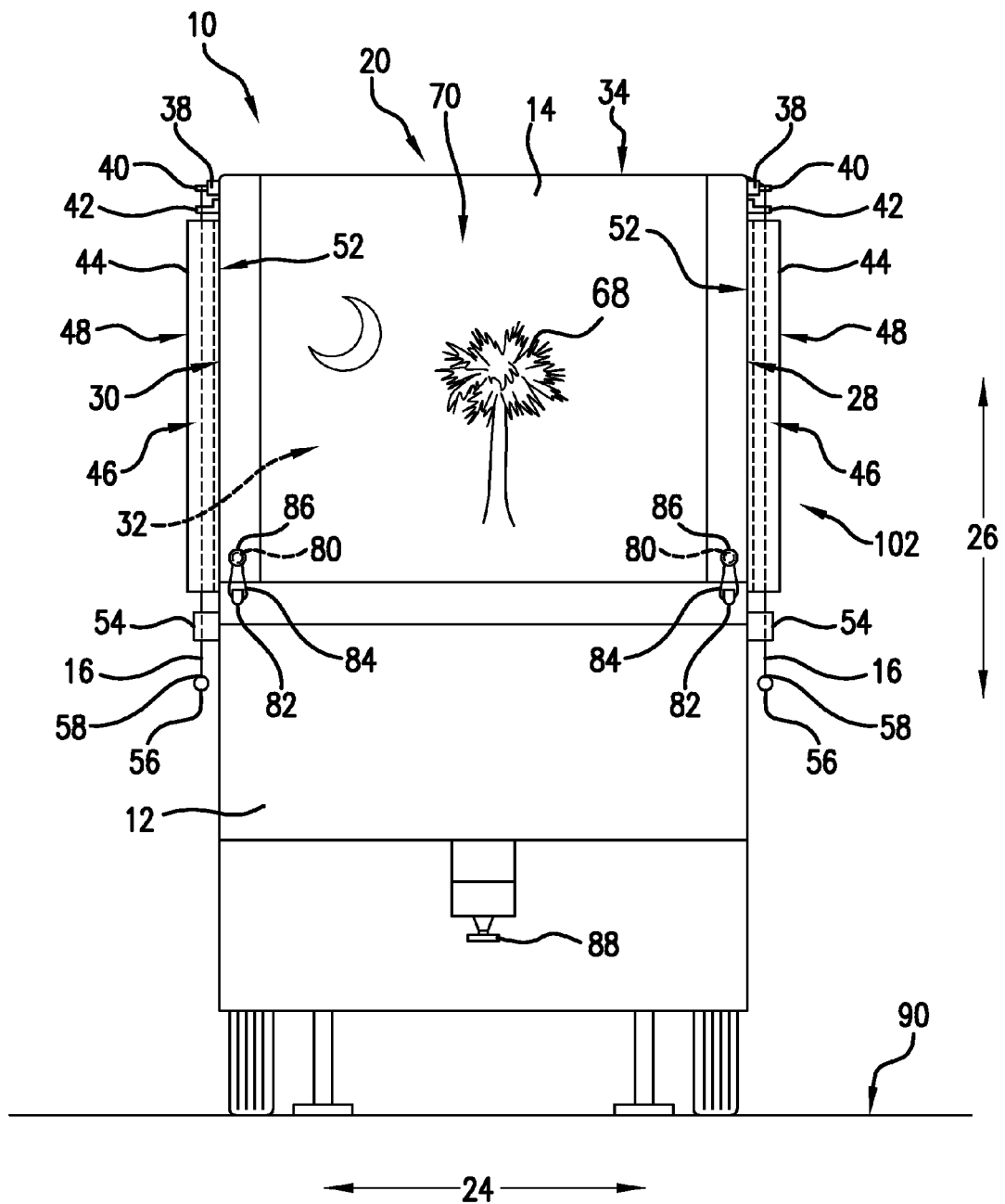
FIG. 1 is a front view of a trailer with a protective cover system in which a cover is in a raised position in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a protective cover system 10 for a trailer 12 that functions to protect a front surface 32 of the trailer 12 from impact with debris during transport of the trailer 12 such as dirt, stones, bugs and the like. The protective cover system 10 includes a line 16 that can be used to reconfigure the cover 14 from a lowered position 18 on the trailer 12 to a raised position 20 onto the front surface 32 when transport of the trailer 12 is desired. The line 16 can also be used to move the cover 14 into the lowered position 18 when one desires to remove the cover 14 from the trailer 12. The cover 14 may be completely detached from the trailer 12 and placed into a washing machine or otherwise cleaned to remove impact debris in a faster and less labor intensive manner than it would take to clean such debris directly from the front surface 32. Further, removal of the cover 14 while at the camp site may be desirable to the users since they will not have to view debris impact on the trailer 12 or cover 14 while camping. Aside from protecting the front surface 32 from debris impact that would otherwise permanently damage the front surface 32 or cause it to be unsightly, the cover 14 may be provided with indicia 68 that provides individual expression for the user and a unique feature to the trailer 12 during transport and during camping should the cover 14 be kept in the raised position 20 during camping. The protective cover system 10 may be provided with a line guard 44 that functions to protect the line 16 during transport and prevent the line 16 from being entangled with other items both when camping and when the trailer 12 is in motion.

With reference to FIG. 1, a front view of the protective cover system 10 is shown with the cover 14 in a raised position 20 on the front surface 32 of the trailer 12. A hook 82 is mounted onto the trailer 12 through any means such as adhesion or mechanical fasteners, and an elastic band 84 is looped onto the hook 82 and remains attached thereto while the cover 14 is in the raised position 20. The cover 14 has on its lower end a lower grommet 80 through which the elastic band 84 is disposed and retained via a ball 86 that is larger than the size of the lower grommet 80 and cannot move through the lower grommet 80. This arrangement may be used to retain the lower end of the cover 14 to the trailer 12. The elastic band 84 may be in tension when the cover 14 is in the raised position 20. Tension in the line 16 and in the elastic band 84 functions to pull the cover 14 taunt against the front surface 32.

The cover 14 has a front surface 70 that includes indicia 68. The indicia 68 may be markings indicative of a state flag, sports team or nation. The indicia 68 may be of any design and may be in any color and may allow for individual expression of the user and can provide a unique and aesthetically pleasing element to the trailer 12 during transport, storage and camping. The cover 14 may thus be configured as a flag in certain embodiments, but it is to be understood that the indicia 68 need not be present on the cover 14 in other embodiments. Although as described as being located on the front surface 70, indicia 68 could in addition be located on the back surface of the cover 14 in other arrangements. In this regard, the user may rotate the cover 14 so that the indicia 68 located on the back surface of the cover 14 is displayed to give the user a second option for display purposes. Regardless of whether the cover 14 is clean or dirty, the cover 14 may remain in the raised position 20 when camping to allow the indicia 68 to be displayed while the trailer 12 is parked and used for camping purposes.

The front surface 32 of the trailer 12 is the surface of the trailer 12 that faces the direction of travel of the trailer 12 during transport. The front surface 32 may include portions that are not covered by the cover 14 when the cover 14 is in the raised position 20. For example, portions of the front surface 32 located proximate to a trailer hitch 88 that is used to connect to the pulling vehicle are not covered by the cover 14. These portions of the front surface 32 may be less susceptible to impact from debris during transport due to their location relative to the pulling vehicle in a vertical direction 26. However, it is to be understood that these portions of the front surface 32 may in fact be contacted with debris and become damaged or unsightly in certain versions of the protective cover system 10. In yet other arrangements, the cover 14 can be made large enough to cover all of the front surface 32 to prevent the entire front surface 32 from being damaged. As such, it is to be understood that the cover 14 when in the raised position 20 may be arranged to protect some of or all of the front surface 32 of the trailer 12.

In the embodiment shown, the protective cover system 10 includes a line 16, a block 38, a guide member 42, line guard 44 and a cam cleat 54 located outboard from a portion of a side surface 30 of the trailer 12 in the lateral direction 24. It is to be understood that although described as being located outboard from the trailer 12 in the lateral direction 24, the portions of the protective cover system 10 need only be located outboard from certain portions of the side surface 30 of the trailer 12 and need not be located outboard from the entire side surface 30 of the trailer 12 in the lateral direction 24.

The line 16 has a lower terminal end 58 onto which a pull ring 56 is located. When the cover 14 is in the raised position 20, the pull ring 56 may be located below the line guard 44 and the cam cleat 54 in a vertical direction 26 of the trailer 12. The vertical direction 26 is the up down direction of the trailer 12 with respect to the ground 90 onto which the trailer 12 is located. The pull ring 56 may be the lowest portion of the protective cover system 10 in the vertical direction 26. The line 16 can be pulled tight when the cover 14 is in the raised position 20 so that there is no slack in the line 16 between the cover 14 and the cam cleat 54. In fact, in some exemplary embodiments, the line 16 can be tensioned from the cover 14 to the cam cleat 54 so that this portion of the line 16 is slightly elongated. However, it is to be understood that in accordance with other exemplary embodiments that the line 16 can have slack thereto at any portion along the length of the line 16.

Figure 2:
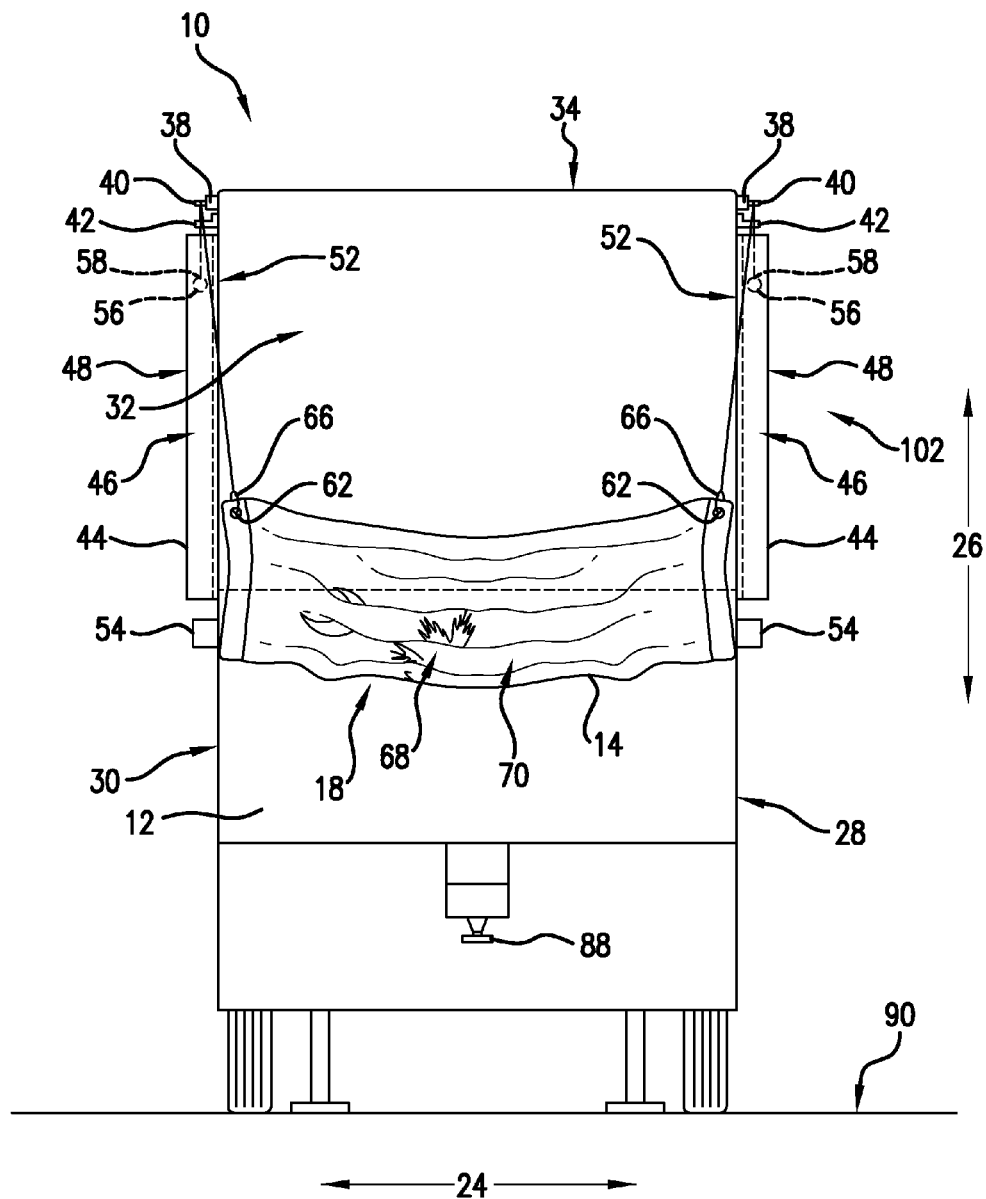
FIG. 2 is a front view of the trailer and protective cover system of FIG. 1 in which the cover is in the lowered position.

FIG. 2 is a front view of the trailer 12 when the cover 14 is reconfigured into the lowered position 18. As shown, the line 16 is attached to an upper end of the cover 14 and is itself reconfigured when the cover 14 moves from the raised position 20 into the lowered position 18 of FIG. 2. The lower terminal end 58 of the line 16 and the pull ring 56 are moved upwards in the vertical direction 26 and are higher than certain portions of the protective cover system 10 in the vertical direction 26 such as portions of the line guard 44. When lowering the cover 14 into the lowered position 18, the line 16 moves past a ring 40 of a block 38 and may be positioned so as to be located forward of the front surface 32 in a longitudinal direction 22. The user may simply allow the cover 14 to fall in the vertical direction 26 via gravity and not hold the line 16 when lowering the cover 14. In other arrangements, the user may push or assist the cover 14 in moving from the raised position 20 to the lowered position 18. In this regard, the user can hold both the line 16 and push the cover 14 simultaneously so that the cover 14 is lowered in a controlled manner to the lowered position 18. It is therefore the case that gravity and/or force applied by the user may be used to move the cover 14 from the raised position 20 to the lowered position 18.

Once in the lowered position 18, the cover 14 may be more easily removed from the trailer 12. The line 16 may be detached from the cover 14. When the cover 14 is in the lowered position 18, the elastic band 84 may no longer be in tension and can be more easily removed from the hook 82. In other embodiments, the elastic band 84 may first be removed from the hook 82, even if under tension, and then subsequently the line 16 can be detached from the cover 14. The cover 14 can then be stored or washed as desired. The elastic band 84 can be subsequently removed from the cover 14 once the cover 14 is removed from the trailer 12 for washing or storage purposes. Cover 14 may be removed from the trailer 12 and placed into a washing machine in order to clean bug residue and debris therefrom. This cleaning of the cover 14 will require much less effort than scrubbing and washing the front surface 32 of the trailer 12.

In order to raise the cover 14 from the lowered position 18 to the raised position 20, the cover 14 is first attached to the line 16 and to the hook 82 if not already attached. The user may grasp the pull ring 56 and apply force downward in the vertical direction 26 in order to move the lower terminal end 58 of the line 16 downward in the vertical direction 26. This movement in turn causes the line 16 to pull on the upper end of the cover 14 so that the cover 14 is likewise pulled upwards along the front surface 32 of the trailer 12 in the vertical direction 26. Depending upon the exact configuration of the cover 14, line 16 and front surface 32, the cover 14 may also move in the lateral direction 24 upon being reconfigured from the lowered position 18 to the raised position 20. The user may simply apply downward force to the lower terminal end 58 of the line 16 to cause the cover 14 to move to the raised position 20, or the user may simultaneously apply this force to the line 16 while also applying force to the cover 14 to pull the cover 14 upwards in the vertical direction 26 and/or guide the cover 14 into the raised position 20. The cover 14 can be moved upwards to such a state that the elastic band 84 is moved into tension upon the cover 14 reaching the raised position 20.

Figure 3:
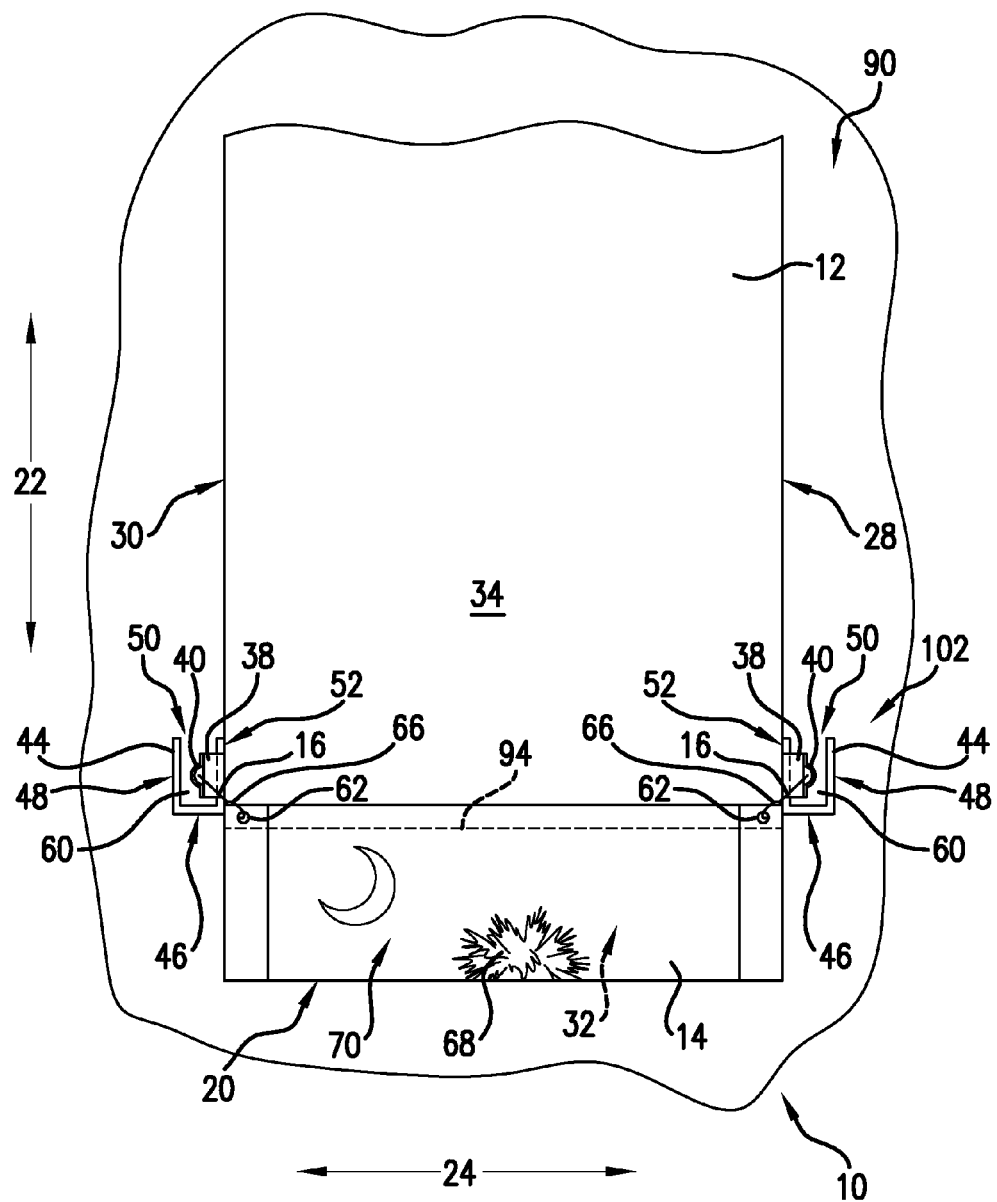
FIG. 3 is a top view of the trailer and protective cover system of FIG. 1.

FIG. 3 is a top view of the trailer 12 with the cover 14 in the raised position 20. The cover 14 extends over the front surface 32 of the trailer 12 and onto an upper surface 34 of the trailer 12. The front surface 32 has a curvature, and the upper surface 34 begins where the curvature of the front surface 32 ends such that the upper surface 34 is entirely flat. An upper surface boundary line 94 is shown to denote the boundary between the upper surface 34 and the front surface 32. Although described as being separated upon the point of curvature of the front surface 32, it is to be understood that in accordance with other exemplary embodiments of the protective cover system 10, that the upper surface 34 may include portions that are curved and need not be entirely flat. Further, the front surface 32 may include flat portions as well as curved portions in other arrangements. In accordance with one exemplary embodiment, the upper surface 34 includes all portions of the trailer 12 that are visible from a top view such that no portion of the front surface 32 is visible in a top view.

The cover 14 includes an upper grommet 62 at its upper end. The line 16 may be directly attached to the upper grommet 62 by way of threading the line 16 through the upper grommet 62 and securing the line with a knot or other means of attachment. In the embodiment shown, an attachment member 66, that may be a clip, is used to attach the line 16 to the upper grommet 62. The attachment member 66 may be a clip that is capable of being opened and disposed into the upper grommet 62 and snapped shut for secure attachment thereto. The line 16 may be permanently attached to the attachment member 66 to effect connection to the cover 14. In other arrangements, the line 16 is not permanently attached to the attachment member and may be attached to the attachment member 66 by way of a knot or other engagement. The attachment member 66 may be made out of any material and in some arrangements may be made out of a softer material or may have a soft exterior surface so as to prevent scratching and damage to the surface of the trailer 12. Although shown as employing an attachment member 66, it is to be understood that the protective cover system 10 need not include an attachment member 66 in other embodiments and that the line 16 can be connected to the cover 14 in a variety of manners.

The upper terminal end of the line 16 is located rearward of the upper surface boundary line 94 in the longitudinal direction 22 and is located inboard of the right side surface 30 of the trailer 12 in the lateral direction 24. The line 16 extends from this point rearward in the longitudinal direction 22 and outboard in the lateral direction 24. It is therefore the case that portions of the protective cover system 10 may be located in the vertical direction 26 above the upper surface 34 when the cover 14 is in the raised position 20. Elements that may be so arranged include portions of the line 16, the upper grommet 62, portions of the cover 14 and the attachment number 66. Other elements of the protective cover system 10 may be located in the vertical direction 26 above the upper surface 34 in other arrangements. However, it is to be understood that other exemplary embodiments of the protective cover system 10 exist in which no portion of the protective cover system 10 is located above the upper surface 34 in the vertical direction 26 such that they are both higher than the upper surface 34 in the vertical direction 26 and simultaneously inboard of the side surface 30 in the lateral direction 24.

A block 38 that includes a ring 40 is attached to the right side surface 30 and is located outboard from the right side surface 30 in the lateral direction 24. The block 38 is rigidly attached to the trailer 12 such that its position does not move relative to the trailer 12. Ring 40 is rigidly attached to block 38 and the position of ring 40 does not change relative to the trailer 12. The line 16 extends outboard in the lateral direction 24 and through the ring 40. The line guard 44 is likewise located outboard of the right side surface 30 in the lateral direction 24 and is itself attached to the right side surface 30. The block 38 with attached ring 40 and the line guard 44 are located rearward of the upper surface boundary line 94, and hence rearward of the front surface 32, in the longitudinal direction 22. In the exemplary embodiment illustrated, no portion of the line 16 is located forward of the upper surface boundary line 94 in the longitudinal direction 22. As such, the entire line 16 is located rearward of the front surface 32 in the longitudinal direction 22. However, it is to be understood that in accordance with other exemplary embodiments of the protective cover system 10 that portions of line 16 may be located forward of the upper surface boundary line 94 in the longitudinal direction 22 when the cover 14 is in the lowered position 18 and when the cover 14 is in the raised position 20.

Figure 4:
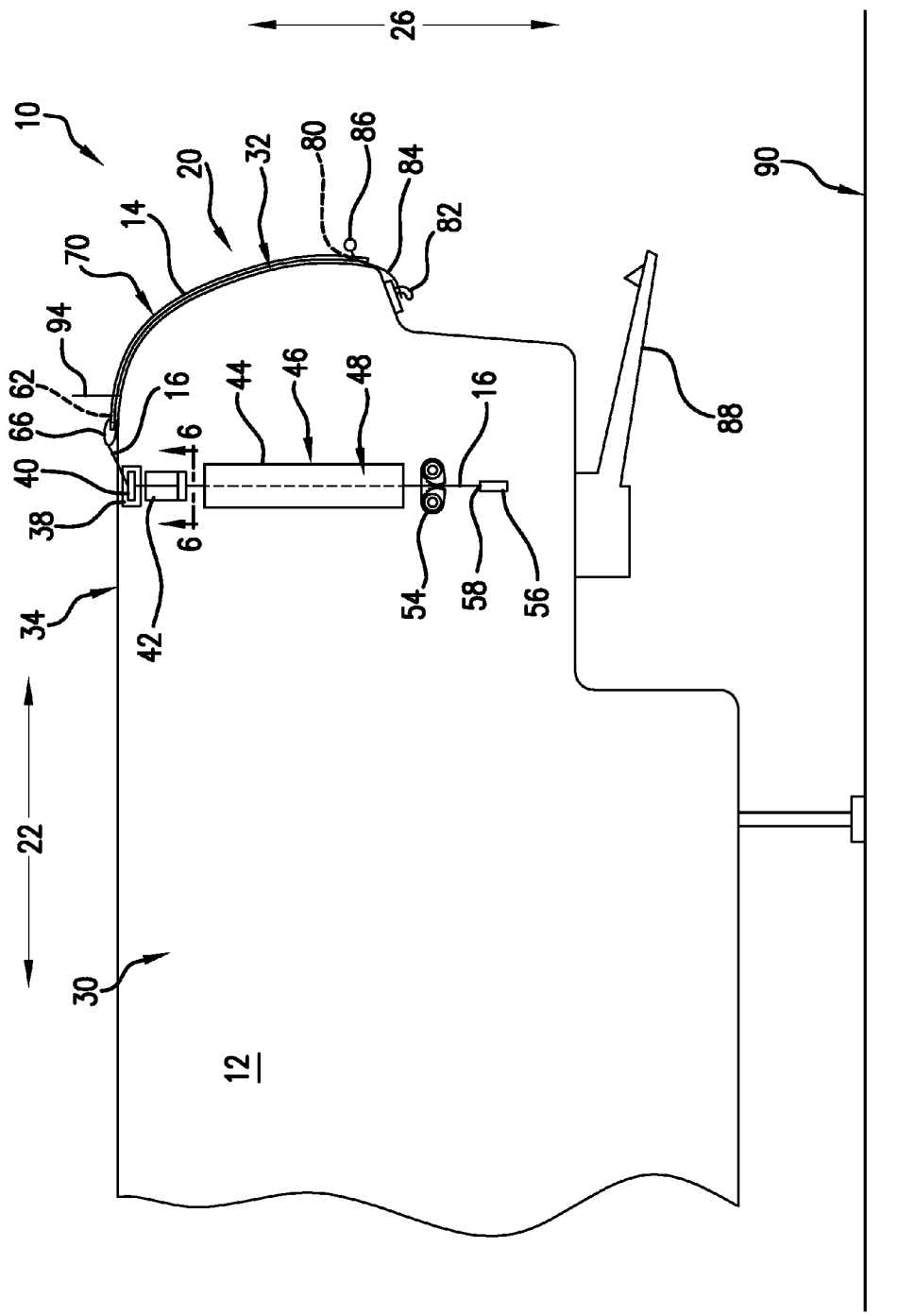
FIG. 4 is a right side view of the trailer and protective cover system of FIG. 1.

FIG. 4 is a side elevation view of the trailer 12 with the protective cover system 10 in the raised position 20 of the cover 14. As shown, the line 16 extends downward in the vertical direction 26 from the block 38 and does not move in the longitudinal direction 22 from the block 38 to the lower terminal end 58. The cam cleat 54 is attached to the right side surface 30 and the line 16 is arranged so that it is disposed through the cam cleat 54 when the cover 14 is in the raised position 20. The cam cleat 54 can be attached to the right side surface 30 through double-sided tape, adhesives, mechanical fasteners, or hook and loop type fasteners. The cam cleat 54 functions to lock the position of the line 16 so that the line 16 cannot move upwards in the vertical direction 26. The weight of the cover 14 acts to pull the line 16 upwards in the vertical direction 26 and thus the cam cleat 54 prevents this upward motion and functions to lock the line 16 in place. As there is no force, and relatively zero weight, acting on the line 16 downward in the vertical direction 26, the line 16 will not move downward relative to the cam cleat 54.

The line 16 may be pulled through the cam cleat 54 so that it is tightly tensioned such that no slack in the line 16 is present from the cam cleat 54 up to the attachment with the cover 14. Tightening of the line 16 in this manner may function to more securely fasten the cover 14 to the trailer 12 and prevent movement or unwanted disturbance of the cover 14 during transport. The portion of line 16 below the cam cleat 54 in the vertical direction 26 and the pull ring 56 may not be attached to any other portion of the protective cover system 10 or trailer 12. However, in some embodiments, the pull ring 56 and/or line 16 could be secured to prevent them from moving or otherwise being entangled with other components.

The line 16 extends completely through the line guard 44 in the vertical direction 26 from the upper end of the line guard 44 to the lower end of the line guard 44. With reference back to FIG. 3, the line guard 44 includes a front surface 46, an outboard surface 48, and an inboard surface 52. The line 16 is located within a cavity 60 defined by the surfaces of the line guard 44. An open back 50 is present in the line guard 44 for use in accessing the line 16 as will be momentarily described. Forward movement of the trailer 12 in the longitudinal direction 22 will cause wind forces to be imparted onto the line 16 as the line 16 is at least partially located outboard of the right side surface 30. The front surface 46 functions to block wind, debris, and other forces from the line 16. The outboard surface 48 also functions to block wind, debris and other forces from the line 16 to prevent or minimize damage to the line 16 and detachment or unwanted movement of the line 16.

With reference to FIG. 3, in accordance with other exemplary embodiments, the inboard surface 52 need not be present. Instead, the front surface 46 may be directly attached to the right side surface 30 and the outboard surface 48 may extend therefrom. Alternatively, the line guard 44 can be provided with the front surface 46 but not the outboard surface 48. In these instances, the front surface 46 may be directly attached to the right side surface 30 or the inboard surface 52 can be present and may be attached to the right side surface 30.

The cover 14 can be located in the raised position 20 so that it does not cover any portion of the side surface 30. In other embodiments, the cover 14 may in fact cover some portion of the side surface 30 when the cover 14 is in the raised position 20.

The guide member 42 is located above the line guard 44 in the vertical direction 26, and the block 38 is located above the guide member 42 in the vertical direction 26. The block 38 and guide member 42 can be attached to the right side surface 30 in a variety of manners. For example, they may be attached through adhesion, mechanical fasteners, hook and loop type fasteners, or other means in accordance with different exemplary embodiments.

The longitudinal direction 22 is the front to back direction of the trailer 12 and would be the direction of travel of the trailer 12 as it is being pulled by the towing vehicle. The lateral direction 24 is perpendicular to the longitudinal direction 22 and is the left/right or inboard/outboard direction of the trailer 12. The vertical direction 26 is the up/down direction with respect to the ground 90 and is perpendicular to both the longitudinal direction 22 and the lateral direction 24.

Figure 6:
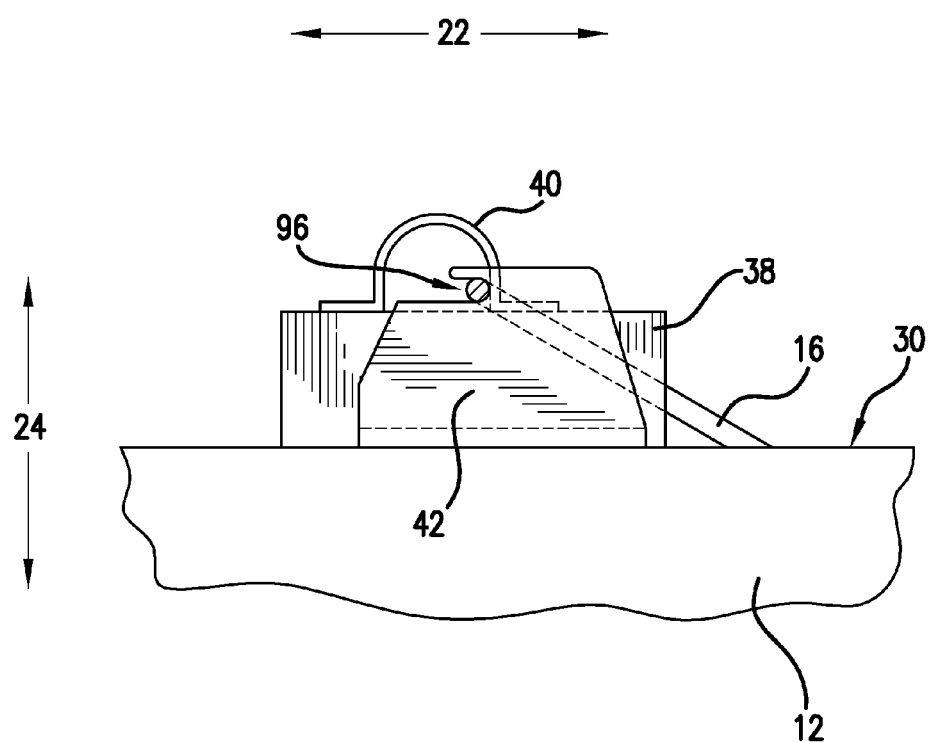
FIG. 6 is a view taken along line 6-6 of FIG. 4.

The bottom of the guide member 42 is shown in greater detail with reference to FIG. 6. The guide member 42 may be an L-shaped member one face of which is attached to the right side surface 30 while the other face extends from the right side surface 30 outboard in the lateral direction 24. This face of the guide member 42 defines a slot 96 that is open on one end. The slot 96 extends forward in the longitudinal direction 22 and the open portion of the slot 96 is located rearward in the longitudinal direction 22. The line 16 is located within the slot 96 and may engage the guide member 42 at the forward end of the slot 96. The guide member 42 functions to prevent movement of the line 16 forward in the longitudinal direction 22. The guide member 42 may also provide some stabilization to the line 16 in the lateral direction 24. As the slot 96 is open, the line 16 may be moved rearward in the longitudinal direction 22 and out of engagement with the guide member 42 in some circumstances. The guide member 42 may be made of a variety of materials such as steel, aluminum, plastic or the like.

The block 38 extends from the right side surface 30 outboard in the lateral direction 24 and may include the ring 40 that forms a closed aperture through which the line 16 is disposed. Although the line 16 is capable of moving through the ring 40 in the vertical direction 26, the closed nature of the ring 40 along with the block 38 limits movement of the line 16 in the longitudinal direction 22 and the lateral direction 24 so that the line 16 is constrained to the aperture defined by the block 38 and the ring 40. The block 38 and ring 40 function to change the direction of travel of the line 16 so that upon downward movement of the lower terminal end 58 the line 16 above the block 38 and ring 40 will move outboard in the lateral direction 24 and rearward in the longitudinal direction 22 and upon traversing through the block 38 and ring 40 will no longer move in these directions but will instead move only in the vertical direction 26 downward. However, it is to be understood that in other exemplary embodiments that the line 16 may have components in the lateral direction 24 and longitudinal direction 22 at points below the block 38 and ring 40 in the vertical direction 26.

The block 38 and ring 40 function to change the orientation of the line 16 to a desired position. The entire block 38 and ring 40 may be located below the upper surface 34 in the vertical direction 26. In accordance with other exemplary embodiments, some or all of the block 38 and/or ring 40 are located above the upper surface 34 in the vertical direction 26.

Figure 5:
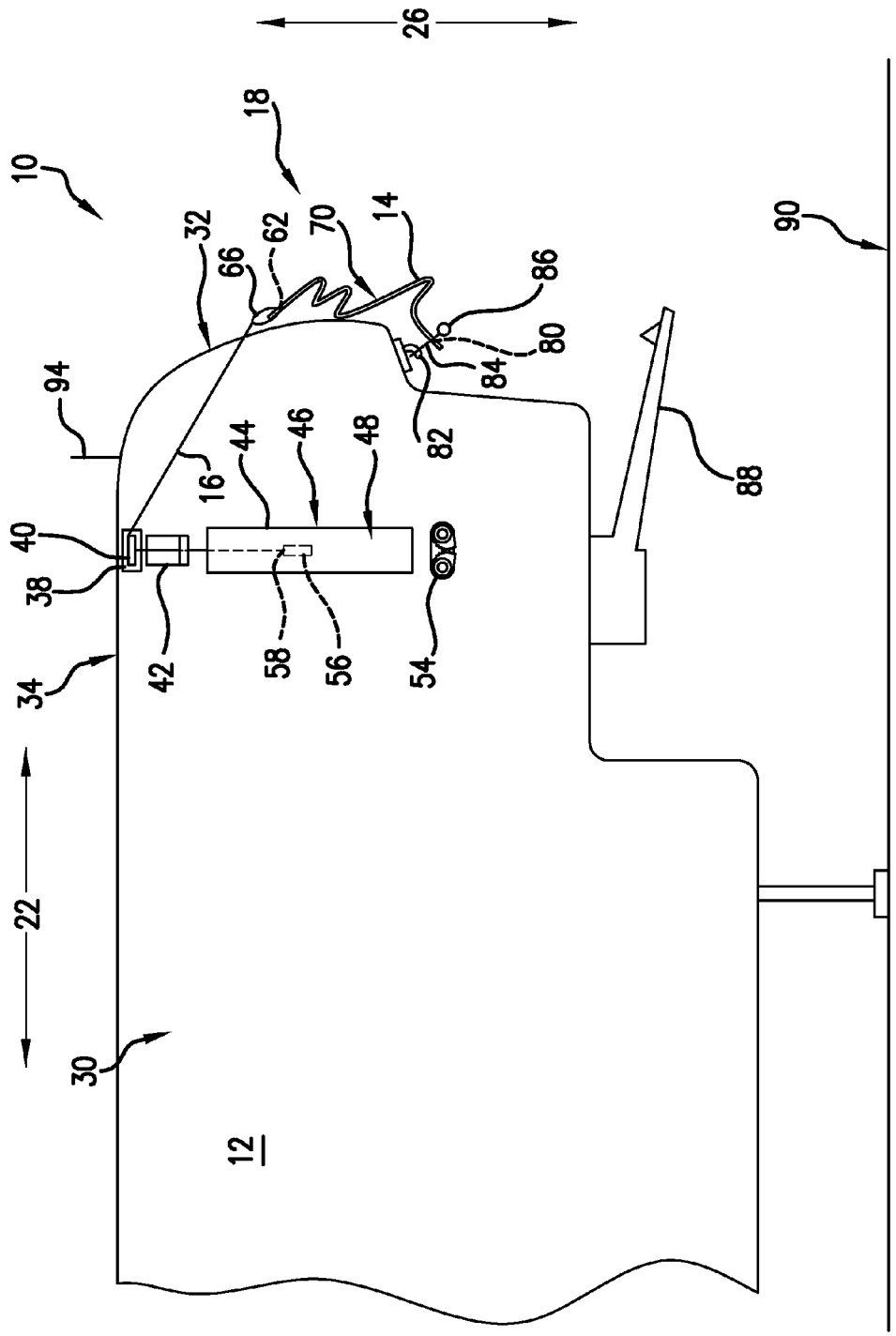
FIG. 5 is a right side view of the trailer and protective cover system of FIG. 2.

With reference to FIG. 5, a side view of the trailer 12 of FIG. 4 is shown in which the protective cover system 10 has been moved into the lowered position 18 of the cover 14. The lower terminal end 58 and the pull ring 56 are located vertically above the cam cleat 54 and are within the line guard 44 in the vertical direction 26. In accordance with other exemplary embodiments, the lower terminal end 58 and the pull ring 56 may be located at the guide member 42 and may in fact engage the guide member 42 to prevent further upward movement of these components in the vertical direction 26. The orientation of the line 16 is further changed in that upon exiting the ring 40 the line 16 does not extend vertically above the upper surface 34 but is instead located entirely below the upper surface 34 in the vertical direction 26. The line 16 extends to the attachment member 66 and may wraparound a portion of the front surface 32 so as to be located longitudinally in front of the front surface 32 and may be located in the lateral direction 24 in board of the right side surface 30. In other embodiments, the line 16 may not be located inboard of the right side surface 30 in the lateral direction 24.

The cover 14 may be made of a flexible material and may be air permeable. In this regard, the cover 14 can be capable of being folded onto itself multiple times and may be bunched up into a position, for example, as shown in FIG. 5. The cover 14 may allow air to flow therethrough such that the cover 14 is made of a material that cannot contain air and thus cannot be inflated. The cover 14 in certain exemplary embodiments may be made of a single layer of material and may not be an inflatable member. Tension in the elastic band 84 may be removed when the cover 14 is in the lowered position 18 to allow the elastic band 84 to more easily be removed from the hook 82 than when in the tensioned state.

Figure 7:
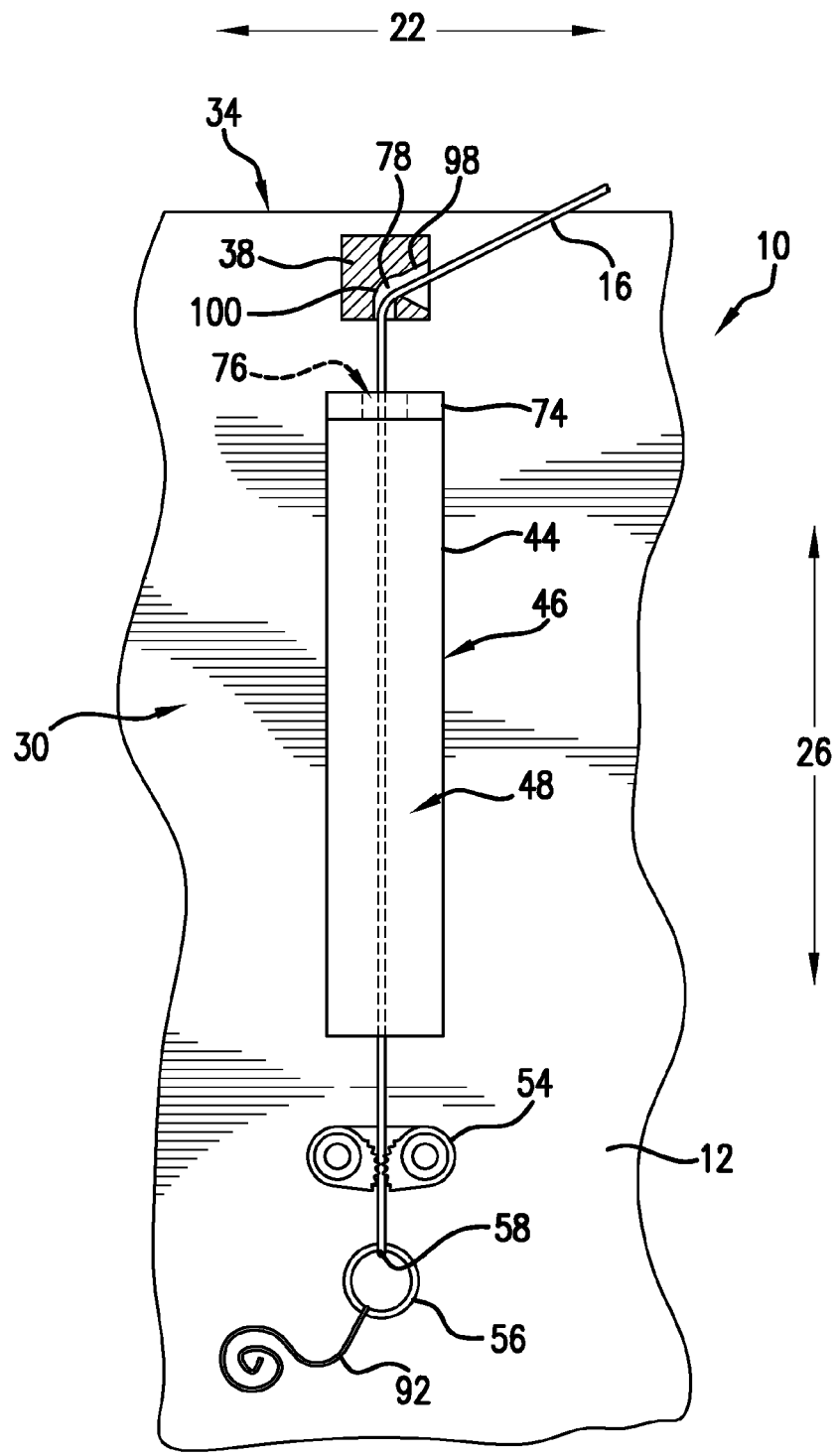
FIG. 7 is a right side view, partially in cross-section of a protective cover system in a raised position of the cover in accordance with another exemplary embodiment.
Figure 8:
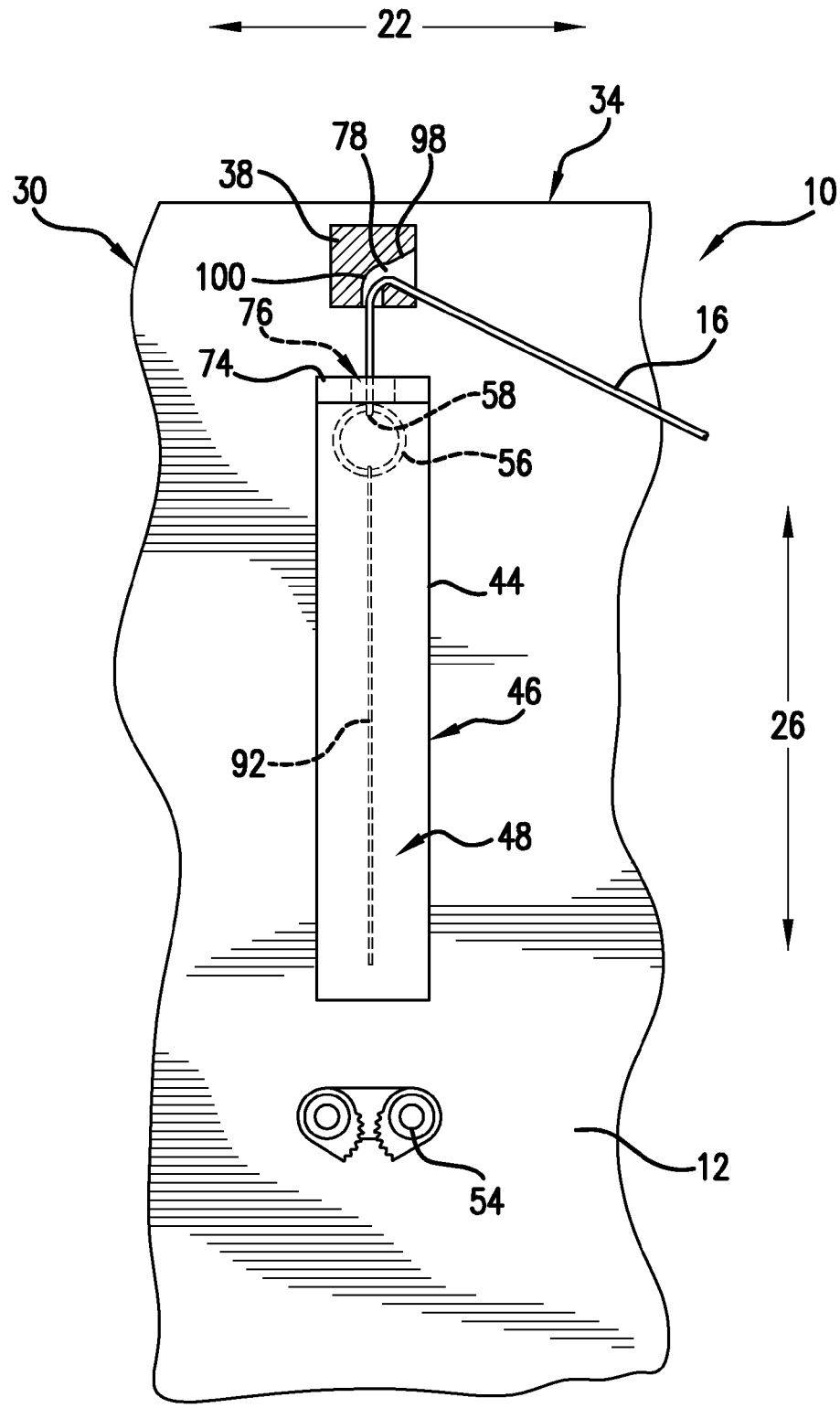
FIG. 8 is a right side view, partially in cross-section of the protective cover system of FIG. 7 with the cover in the lowered position.
Figures 9, 10, 11:
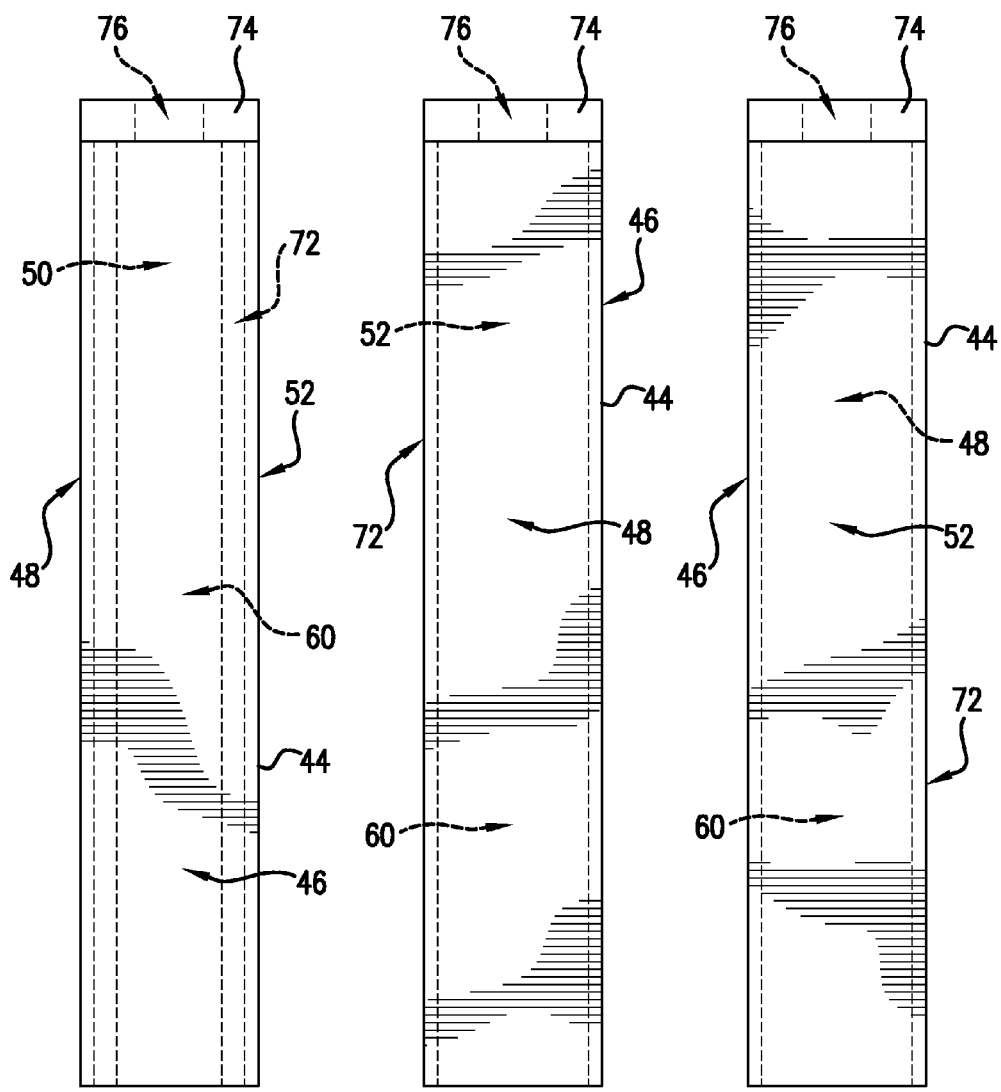
FIG. 9 is a front view of a line guard in accordance with the exemplary embodiment of FIG. 7.
FIG. 10 is a right side view of the line guard of FIG. 9.
FIG. 11 is a left side view of the line guard of FIG. 9.
Figure 12:
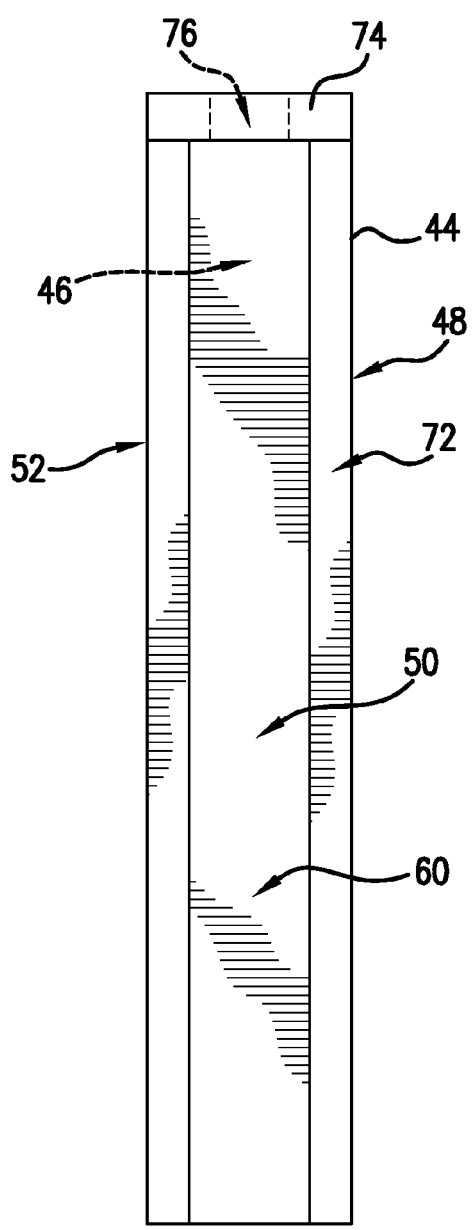
FIG. 12 is a back view of the line guard of FIG. 9.
Figure 13:
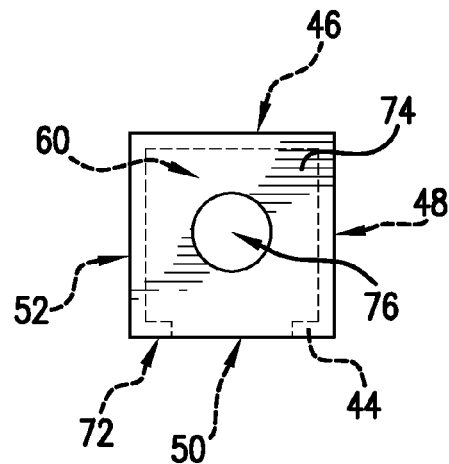
FIG. 13 is a top view of the line guard of FIG. 9.

FIGS. 7 and 8 show an alternative exemplary embodiment of the protective cover system 10 from that previously illustrated. With reference first to FIG. 7, a grasping line 92 is attached to the pull ring 56 and may be either attached to the trailer 12 to prevent it from moving or can be unattached to the trailer 12 and allowed to move if desired. The line guard 44 is arranged in a different manner from that previously described, and a pull ring stop 74 is located at the top of the line guard 44 in the vertical direction 26. An aperture 76 extends through the pull ring stop 74 and the line 16 in turn extends through both the aperture 76 and the line guard 44. The guide member 42 is not present, and the block 38 is arranged in a different manner, from that previously described. The block 38 is completely located below the upper surface 34 in the vertical direction 26, but as previously described some or all of the block 38 could be located above the upper surface 34 in the vertical direction 26 in other arrangements. The line 16 is arranged in a similar manner to that previously described in that the line 16 may move downward in the vertical direction 26 to the block 38, rearward in the longitudinal direction 22 to the block 38, and in some arrangements outboard in the lateral direction 24 to the block 38. Upon exiting the block 38, the line 16 moves vertically downward in the vertical direction 26 and its orientation in the longitudinal direction 22 and the lateral direction 24 may not change from this point all the way to the lower terminal end 58.

FIG. 8 shows the protective cover system 10 of FIG. 7 in which the cover 14 is moved into the lowered position 18. The lower terminal end 58 and the pull ring 56 are located at the upper portion of the line guard 44. Upward movement of the pull ring 56 and hence the lower terminal end 58 in the vertical direction 26 is prevented due to contact between the pull ring 56 and the pull ring stop 74. The aperture 76 although large enough to allow the line 16 to move therethrough is of a size and/or shape that does not allow the pull ring 56 to move therethrough. As such, the pull ring 56 is prevented from moving in the vertical direction 26 beyond the pull ring stop 74. In use, when the pull ring 56 is moving upwards in the vertical direction 26 a controlled movement may be affected by holding the pull ring 56 or other component of the protective cover system 10 so that the pull ring 56 does not impact the pull ring stop 74 with a sufficient amount of force. In other arrangements, the pull ring 56 may be released and can engage the pull ring stop 74 with a high amount of force such as would be the case should the cover 14 be made of a heavy material and/or soaked with rain. The connection between the lower terminal end 58 and pull ring 56, along with the attachment of the pull ring stop 74 and the line guard 44 may be made so as to be robust enough to handle such an engagement.

Figure 14:
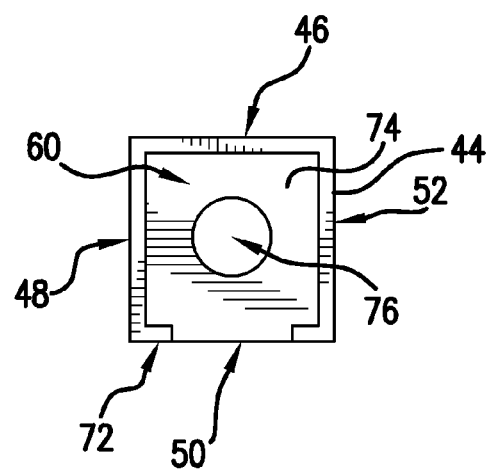
FIG. 14 is a bottom view of the line guard of FIG. 9.

The line guard 44 in the currently discussed embodiment is shown in greater detail with respect to FIGS. 9-14. The line guard 44 includes a front surface 46 that extends in the vertical direction 26 and from which the outboard surface 48 and the inboard surface 52 extend so as to form the right side and left side respectively of the line guard 44. A back surface 72 extends from both the outboard surface 48 and the inboard surface 52. An open back 50 is defined in the back surface 72 and is open at the lower terminal end of the line guard 44. The line guard 44 may be made of $\frac{7}{8}^{th}$ square inch PVC tubing in accordance with one exemplary embodiment, and the open back 50 can be made by cutting out a portion of the back surface 72. The bottom terminal end of the line guard 44 is open both at the bottom as shown in FIG. 14, and at the back via the open back 50. The surfaces 46, 48 and 52 may all be of the same size and shape in certain embodiments, or may be variously sized and shaped, although shown as being planer surfaces, the surfaces of the line guard 44 need not be planer in accordance with other exemplary embodiments.

The pull ring stop 74 engages the upper terminal end of the line guard 44 and as shown engages the front surface 46, outboard surface 48, inboard surface 52, and back surface 72. The open back 50 may terminate at the pull ring stop 74 such that the open back 50 forms a slot in the back surface 72 that is open at its bottom but closed at its top. The cavity 60 may be defined by the various surfaces 46, 48, 52, and 72 of the line guard 44. Although shown as having a square cross sectional shape, the cavity 60 can be variously shaped in accordance with other exemplary embodiments.

The pull ring stop 74 may be made of the same material as the line guard 44 and can be attached to the upper terminal end of the line guard 44 in a variety of manners. For example, the pull ring stop 74 may be attached via adhesion, mechanical fasteners, or in some circumstances may be integrally formed with the line guard 44 such that they are essentially a single piece. The aperture 76 is shown as being circular but could be variously configured in other arrangements. The aperture 76 extends completely through the pull ring stop 74 and is centered with respect to the cavity 60. The pull ring stop 74 can be variously configured in accordance with other exemplary embodiments and need not engage the upper terminal end of the line guard 44 and instead may be a separate component or may be attached to the block 38.

Figure 15:
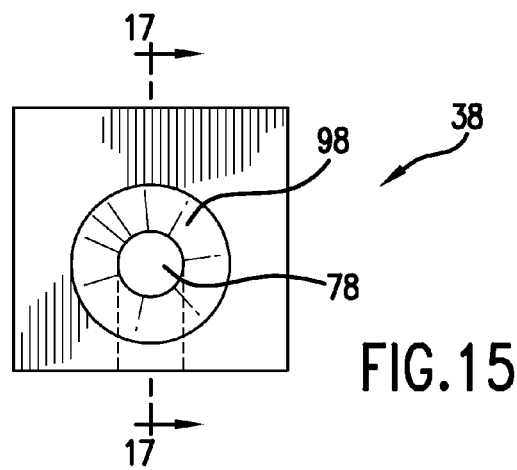
FIG. 15 is a front view of a block in accordance with the exemplary embodiment of FIG. 7.
Figure 16:
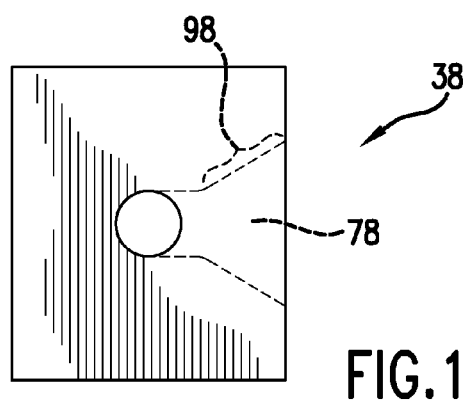
FIG. 16 is a bottom view of the block of FIG. 15.
Figure 17:
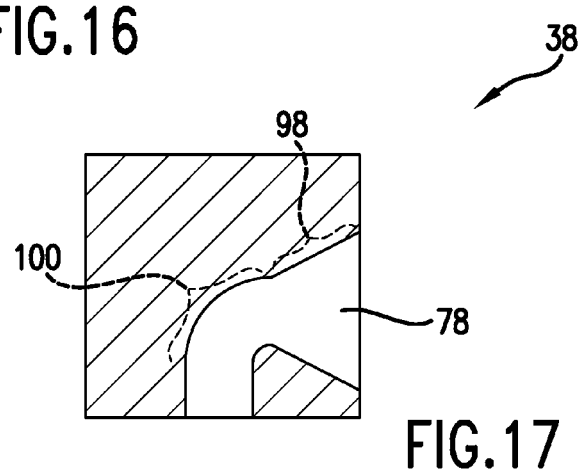
FIG. 17 is a cross-section view taken along line 17-17 of FIG. 15.

The block 38 of the exemplary embodiment shown in FIGS. 7 and 8 is illustrated in greater detail with reference to FIGS. 15-17. The block 38 may include a molded component with an aperture 78 that extends therethrough. The aperture 78 may extend from one surface of the block 38 through the block 38 to a different surface of the block 38 that in some embodiments may be perpendicular to the first surface of the block 38. The aperture 78 may have a circular cross section at all points along its length or may have different cross-sectional shapes at different points along its length. As shown, the aperture 78 in the exemplary embodiments of FIGS. 15-17 has a cross-sectional shape that varies along its length.

The aperture 78 includes a conical portion 98 that extends from a surface of the block 38 to an interior location within the block 38. The conical portion 98 has a larger diameter at the surface of the block 38 and the cross-sectional shape decreases in size upon extension into the block 38. With reference back to FIGS. 7 and 8, the conical portion 98 may accommodate the reorientation of the line 16 with respect to the lateral direction 24 and the vertical direction 26 due to reconfiguration of the cover 14 between the lowered and raised positions 18 and 20. In other embodiments, the aperture 78 need not have the conical portion 98 at this location and a circular cross-sectional shape may in fact accommodate reorientation of the line 16 in the lateral direction 24 and vertical direction 26. The aperture 78 extends from the conical portion 98 into a curved section 100. The curved section 100 thus changes the direction of travel of the line 16 through the block 38 so that it may in some instances move roughly 90° upon traveling through the curved section 100. The curved section 100 can be shaped so as to provide a smooth transition for the line 16 through the block 38. The curved section 100 may thus be sized and shaped so that the line 16 does not become pinched and trapped within the aperture 78 when moving through the aperture 78. The curved section 100 can extend from the conical portion 98 to the bottom surface of the block 38 or may extend to a point within the interior of the block 38 at which point the aperture 78 extends in a straight direction to the bottom surface of the block 38. As shown with reference to FIG. 17, the curved section 100 terminates before the bottom surface of the block 38 and the remaining portion of the aperture 78 from the curved section 100 to the bottom surface of the block 38 is straight.

The block 38 is arranged on the right side surface 30 of the trailer 12 so that the conical portion 98 forms an aperture on the front surface of the block 38 that faces forward in the longitudinal direction 22. The aperture 78 extends through the block 38 and forms an aperture at the bottom surface of the block 38 that faces downward in the vertical direction 26. The block 38 is spaced from the pull ring stop 74 in the vertical direction 26 but may engage the pull ring stop 74 in other embodiments. In yet further arrangements, the block 38 and the pull ring stop 74 can be intricately formed with one another. In yet additional exemplary embodiments of the protective cover system 10, the pull ring stop 74 need not be present, and the block 38 can function as the pull ring stop 74 in that the pull ring 56 will not be able to fit through the aperture 78 and thus its movement in the vertical direction 26 or past the block 38 will be prevented.

Modification of the protective cover system 10 so that the cover 14 is moved from the lowered position 18 to the raised position 20 may first require the user to obtain access to the line 16. With reference to FIG. 8, the pull ring 56 may be located at a height in the vertical direction 26 that cannot be reached by the user. In these instances, the user may obtain an elongated hooking device commonly provided with trailers 12 that he or she may use to hook the pull ring 56 and draw it downwards in the vertical direction 26 for subsequent grasping. Alternatively, the grasping line 92 may be provided and may be attached to the pull ring 56. As shown in FIG. 8, the grasping line 92 is at a height in the vertical direction 26 that can be grasped by a user. The user may pull the line 16 downward in the vertical direction 26 so that it moves through the line guard 44 in the vertical direction 26.

The line 16 when being moved downward may also be moved in the longitudinal direction 22 rearward and may be removed from the line guard 44 via the open back 50. Upon moving the line 16 in the vertical direction 26 downward past the cam cleat 54, the line 16 may be positioned outboard of the cam cleat 54 in the lateral direction 24. The user may engage the line 16 with the cam cleat 54 and apply pressure both inboard in the lateral direction 24 and downward in the vertical direction 26 so that the line 16 becomes attached to the cam cleat 54 and is capable of being held by the cam cleat 54. If the line 16 and pull ring 56 are not in a desired position, the user may continue to pull the line 16 downward in the vertical direction 26 so that the cover 14 is moved into the raised position 20 as desired. The raising of the cover 14 may be effected completely through movement of the line 16, or the user may both move the line 16 and also manually position the cover 14 on the trailer 12. Once positioned, the user may release the line 16 and the cam cleat 54 may engage the line 16 and lock it thus preventing movement upwards in the vertical direction 26. The line 16 when the cover 14 is in the raised position 20 is free to move downward in the vertical direction 26 but is restrained from moving upwards in the vertical direction 26.

In order to lower the cover 14 into the lowered position 18, the user will first grasp the line 16 or pull ring 56 and pull the line 16 downwards in the vertical direction 26. This action will release the cam pressure of the cam cleat 54 on the line 16. Once released, the user may then pull the line 16 outboard in the lateral direction 24 in order to completely disengage the line 16 from the cam cleat 54. It is to be understood that in other exemplary embodiments of the protective cover system 10 that the cam cleat 54 can be arranged so that it is not on the right side surface 30 of the trailer 12. In these instances, the line 16 will simply be moved in a direction perpendicular to the locking direction of the cam cleat 54 in order to remove the line 16 therefrom.

The line 16 is moved in a direction tangential to the direction of travel of the line 16 through the cam cleat 54 in order to remove the line 16 from the cam cleat 54. This tangential direction may be in the longitudinal direction 22, lateral direction 24, or in some other combination of these two directions 22 and 24 when the line 16 moves in the vertical direction 26 through the cam cleat 54.

Once removed, the user may pull the pull ring 56 and line 16 rearward in the longitudinal direction 22 to cause it to be removed from the line guard 44 via the open back 50. The user may then allow the line 16 and pull ring 56 to raise in the vertical direction 26 while the pull ring 56 is outside of the line guard 44. The user may assist the cover 14 manually as well to ensure that it is properly lowered from the raised position 20. Once the pull ring 56 is moved vertically upwards, it may be released at some point and allowed to move back into the line guard 44 through the open back 50 and can engage the pull ring stop 74 at the aperture 76. The pull ring 56 and thus line 16 will be prevented from further upward movement at this point in the vertical direction 26 and the cover 14 will be in the lowered position 18.

Although described as being removed from the line guard 44 during raising and lowering of the cover 14, in other exemplary embodiments the line 16 remains within the line guard 44 at all times and is not removed through an open back 50. Further, although described as having a cam cleat 54, it is to be understood that this component need not be present in other exemplary embodiments. Instead, the line 16 may be attached to a portion of the trailer 12 or to some other attachment member of the protective cover system 10 that prevents movement of the line 16.

With reference back to FIG. 1, a second set 102 of protective cover elements are shown and are associated with the left side surface 28 of the trailer 12. The second set 102 can include the exact same elements as previously described with respect to those elements of the protective cover system 10 associated with the right side surface 30. In this regard, the second set 102 may include the line 16, line guard 44, block 38 and/or guide member 42, and a repeat of this information is not necessary. The second set 102 may be provided in the exact same manner as the first set associated with the right side surface 30, or various components of the second set 102 can be different from, additional to, or eliminated from those associated with the right side surface 30.

With reference to FIG. 2, the line 16 of the second set 102 is attached to the upper end of the cover 14 in the same manner as that associated with the upper grommet 62 and line 16 of the right side surface 30 elements. A similar elastic band 84 and hook 82 arrangement can be used to attach a lower grommet to the cover 14 in relation to the second set 102 of protective cover elements. In use, the user may first lower or raise the cover 14 with respect to the protective cover elements associated with the right side surface 30, and then move over to the other side of the trailer 12 and raise or lower the cover 14 with the use of the second set 102. In other exemplary embodiments, the user may partially raise or lower the cover 14 with respect to one of the sets and then partially raise or lower the cover 14 with respect to the other set of protective cover elements. However, it may be the case that in use, if two lines 16 are used to hold the cover 14 into the raised position 20, release of tension or lowering of one of the lines 16 will not be sufficient to cause the cover 14 to move into the lowered position 18 because the other line 16 will still effect holding. In these instances, the user may simply use one side of the protective cover system 10 and then subsequently move to the second set 102 in order to fully lower the cover 14 into the lowered position 18. The same may be true upon raising the cover 14 from the lowered position 18 to the raised position 20. In this regard, the use of a single line 16 may be sufficient to raise the cover 14 substantially into the raised position 20. Use of the second set 102 will then fully complete configuration of the cover 14 to the raised position 20.

Although shown and described as having two sets of protective cover elements, it may be the case that in certain exemplary embodiments only a single set of protective cover elements are present and the second set 102 is not present. As such, the protective cover system 10 can be located so that some or all of the components are located outboard of one of the side surfaces 28 or 30 but no components are located outboard of the other one of the side surfaces 28 or 30 in the lateral direction 24. Further, in yet additional exemplary embodiments multiple sets of protective cover elements may be used in the protective cover system 10.

The lines 16 are arranged so that they are not tied together. In this regard, the line 16 associated with the first set of protective cover elements is completely separate from the line 16 associated with the second set 102 of protective cover elements. The line 16 associated with the right side surface 30 is separate from the line 16 associated with the second set 102 of protective cover elements at the left side surface 28. These two lines 16 are separated from one another in the lateral direction 24 and do not contact one another. The line 16 does not extend across the entire lateral length of the cover 14 in the lateral direction 24 when the cover 14 is in the raised position 20. As such, there is no line present at the lateral midpoint of the cover 14 when in the raised position 20.

The cover 14 is shown as having four grommets for use in securing the cover 14 to the trailer 12. However, it is to be understood that any number of grommets that may be used in accordance with other exemplary embodiments. For example, from 1-5, from 6-10, or up to 20 grommets and corresponding attachments can be used to effect the attachment of the cover 14 to the trailer 12.

Figure 18:
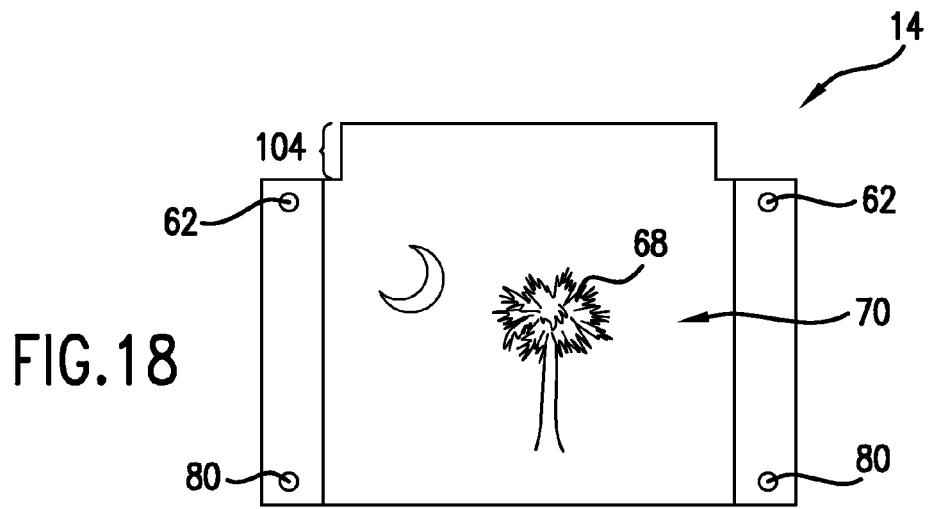
FIG. 18 is a front view of a cover in accordance with another exemplary embodiment.

An alternative arrangement of the cover 18 is disclosed with reference to FIG. 18. The cover 18 may be arranged the same as that previously disclosed and a repeat of this information is not necessary. However, and extra extension portion 104 may extend from the upper edge of the cover 18 so that the cover 18 is higher than previous embodiments. The extra extension portion 104 can form a portion of the front surface 70 and the indicia 68 may or may not be present on the front surface 70 of the extension portion 104. The extension portion 104 is spaced inwards from the two side edges of the cover 18 so that square or rectangular cut out type voids are present proximate to the upper corners of the cover 18. The grommets 62 and 80 can be located outboard from the extension portion 104 and may be below the cut out type voids in the left and right direction of the cover 14. The extension portion 104 may extend from 6-8 inches in the height direction of the cover 14. The extension portion 104 may allow for a better fit of the cover 14 and hence better protection of the upper portions of the trailer 12 due to the configurations of the upper surface 34 and front surface 32 of various trailer 12 types.

Figure 19:
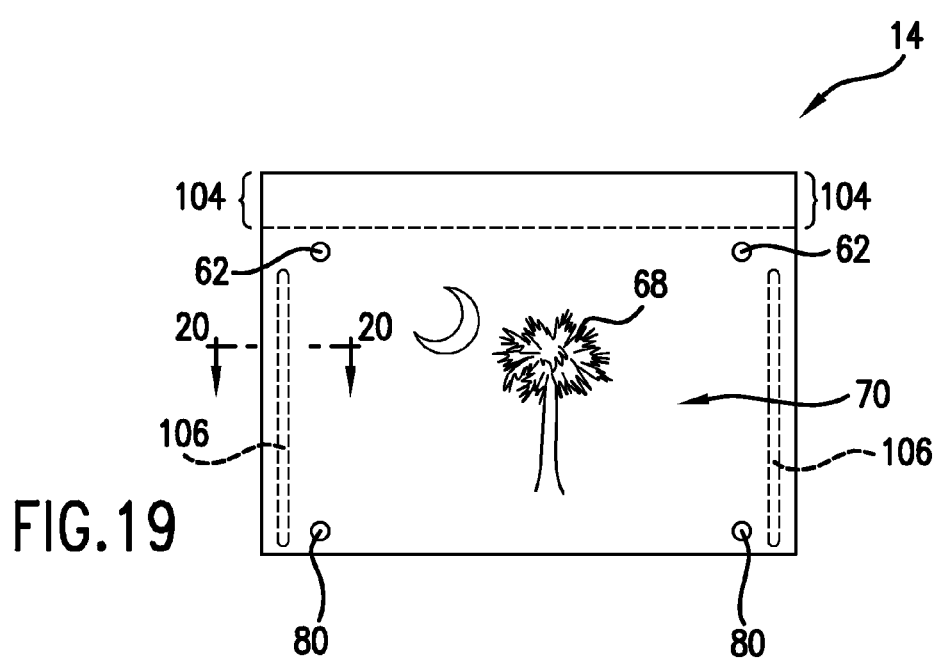
FIG. 19 is a front view of a cover in accordance with a yet additional exemplary embodiment.

Another alternative arrangement of the cover 14 is shown with reference to FIG. 19 in which the extension portion 104 is again present and may be from 6-8 inches in the height direction and located at the top of the cover 14 in order to extend the height of the cover 14. The extension portion 104 may again be provided to better protect the upper surface 34 and/or front surface 32 of certain types of trailers 12. The indicia 68 may or may not be located in the extension portion 104. The extension portion 104 extends from one side of the cover 14 to the opposite side of the cover 14 and there are no cut out type voids present. The extension portion 104 is above the grommets 62 and 80 in the height direction.

Figure 20:
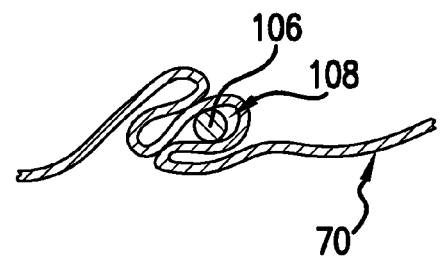
FIG. 20 is a cross-sectional view taken along line 20-20 of FIG. 19.

The sides of the cover 14, that may or may not be reinforced, may be looped onto one another in order to form a pocket 106 as can be seen in FIG. 20. The pocket 106 can be formed by one loop or up to 4 loops of the cover 14 onto itself in various arrangements. The pocket 106 may extend the entire vertical length of the cover 14 or may be less than the entire vertical length in various arrangements. A rod 106 is located within the pocket 106 and may extend from the bottom, or from just above the bottom, of the cover 14 to a point below the grommet 62 in the height direction. In other arrangements, the rod 106 may extend vertically above the upper grommet 62 and even into the extension portion 104 in certain arrangements. The rod 106 can be flexible and can be used to protect he upper most portions of the trailer 12. The rod 106 may be used to help the cover 14 better fit onto the upper surface 34 and front surface 32 of various trailer 12 types.

The rod 106 may be ¼" in diameter in some arrangements and may be made of graphite or plastic. A second pocket 108 and rod 106 can be included on the other side of the cover 14. Although described as being contained within a pocket 108, a tube or other holding mechanism can be employed to cause the rod 106 to be retained onto the cover 14. The rod 106 can be inboard or outboard of the grommets 62, 80 proximate to the rod 106 in the side direction.

Although described as being used with a trailer 12 that is a fifth wheel trailer used for camping, the protective cover system 10 can be used with various types of trailers 12 in accordance with other exemplary embodiments. For instance, trailer 12 may be a transport trailer of a tractor trailer truck, a utility trailer, or any other type of trailer carried by a pulling vehicle.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A protective cover system for a trailer, comprising:
a cover for covering a portion of the trailer, wherein the trailer has an upper surface and a vertical direction that extends from ground to the upper surface, wherein the trailer has a right surface and a left side surface and a lateral direction that extend from the right side surface to the left side surface, wherein the trailer has a longitudinal direction that extend from front surface of the trailer to a back of the trailer, wherein the front surface is oriented in a direction of travel of the trailer when the trailer is pulled; and a line, wherein the line moves relative to the trailer for moving the cover from a lowered position to a raised position, wherein when the cover is in the raised position a portion of the line is located outboard from the right side surface of the trailer in the lateral direction and is located rearward of the front surface of the trailer in the longitudinal direction;

wherein when the cover is in the raised position a different portion of the line is located simultaneously:

higher than the upper surface of the trailer in the vertical direction, inboard of both the right and left side surfaces in the lateral direction, and rearward of the front surface of the trailer in the longitudinal direction.

2. The protective cover system as set forth in claim 1, further comprising:

a block that is attached to the trailer and that does not move relative to the trailer, wherein the block has a ring, wherein the block and the ring are located outboard from the side surface of the trailer in the lateral direction, wherein the line is disposed through the ring, wherein the ring does not move relative to the block, wherein both the block and the ring are located rearward of the front surface of the trailer in the longitudinal direction; and a guide member attached to the trailer, wherein the guide member is located outboard from the side surface of the trailer in the lateral direction, wherein the line engages the guide member, wherein the guide member limits movement of the line forward in the longitudinal direction, wherein the guide member is located rearward of the front surface of the trailer in the longitudinal direction.

3. The protective cover system as set forth in claim 1, further comprising a line guard that is located outboard from the side surface of the trailer in the lateral direction, wherein the line guard has a front surface that extends in the vertical direction and an outboard surface that extends in the vertical direction, wherein the line guard defines an open back, wherein the line is located in the line guard, wherein the line guard is located rearward of the front surface of the trailer in the longitudinal direction.

4. The protective cover system as set forth in claim 1, further comprising:

a cam cleat through which the line is disposed, wherein the line moves downward in the vertical direction through the cam cleat but is prevented from moving upwards in the vertical direction through the cam cleat, wherein movement of the line in a direction tangential to the vertical direction causes the line to be removed from the cam cleat, wherein the cam cleat is located outboard from the side surface of the trailer in the lateral direction and is located rearward of the front surface of the trailer in the longitudinal direction; and a pull ring located at a lower terminal end of the line, wherein the pull ring is located outboard from the side surface of the trailer in the lateral direction and is located rearward of the front surface of the trailer in the longitudinal direction, wherein the ring is secured only to the lower terminal end of the line when the cover is in the raised position.

5. The protective cover system as set forth in claim 1, wherein the different portion of the line that is located simultaneously:

higher than the upper surface of the trailer in the vertical direction, inboard of both the right and left side surfaces in the lateral direction, and rearward of the front surface of the trailer in the longitudinal direction is an attachment member that is attached to the cover.

6. A protective cover system for a trailer, comprising:

a cover for covering a portion of the trailer, wherein the trailer has an upper surface and a vertical direction that extends from ground to the upper surface, wherein the trailer has a right surface and a left side surface and a lateral direction that extend from the right side surface to the left side surface, wherein the trailer has a longitudinal direction that extend from front surface of the trailer to a back of the trailer, wherein the front surface is oriented in a direction of travel of the trailer when the trailer is pulled; and a line, wherein the line moves relative to the trailer for moving the cover from a lowered position to a raised position; and a line guard that is located outboard from one of the side surfaces of the trailer in the lateral direction, wherein the line moves downward relative to the line guard in the vertical direction when the cover is moved from the lowered position to the raised position such that the line moving downward past the line guard is located rearward in the longitudinal direction from the front surface of the trailer is located outboard in the lateral direction from the side surface that the line guard is outboard from.

7. The protective cover as set forth in claim 6, wherein the line guard has a front surface that extends in the vertical direction, wherein the line is located rearward of the front surface in the longitudinal direction, wherein the line guard is located rearward from the front surface of the trailer in the longitudinal direction.

8. The protective cover as set forth in claim 6, wherein the line guard has an outboard surface that extends in the vertical direction, wherein the line guard has an inboard surface that extends in the vertical direction, wherein the line guard has a front surface that extends in the vertical direction, wherein the line guard has a back surface that extends in the vertical direction;

wherein the outboard surface, the inboard surface, the front surface and the back surface define a cavity into which the line is located, wherein the back surface defines an open back, wherein the line is located inboard of the outboard surface in the lateral direction.

9. The protective cover as set forth in claim 6, further comprising:

a pull ring located at a lower terminal end of the line, wherein the pull ring is located outboard from the side surface of the trailer in the lateral direction; and a pull ring stop that defines an aperture, wherein the line is disposed through the aperture.

10. The protective cover as set forth in claim 6, further comprising a block that defines an aperture therethrough, wherein the line is located through the aperture of the block, wherein the aperture of the block changes direction through the block as the aperture of the block extends through the block.

11. The protective cover as set forth in claim 6, wherein the line is located above the upper surface of the trailer in the vertical direction and is located rearward of the front surface of the trailer in the longitudinal direction, wherein the line is located outboard from the side surface of the trailer in the lateral direction.

12. The protective cover system as set forth in claim 6, wherein the cover is a flexible member that is air permeable and not inflatable, wherein the cover is bunched up when in the lowered position and is not bunched up when in the raised position, wherein the cover has an extension portion located at the top of the cover that has a width that extends from one side of the cover to an opposite side of the cover, and wherein the cover defines a pocket and wherein a rod that is flexible is located in the pocket.

13. The protective cover system as set forth in claim 6, further comprising: a cam cleat through which the line is disposed, wherein the line moves downward in the vertical direction through the cam cleat but is prevented from moving upwards in the vertical direction through the cam cleat, wherein movement of the line in a direction tangential to the vertical direction causes the line to be removed from the cam cleat, wherein the cam cleat is located outboard from the side surface of the trailer in the lateral direction and is located rearward of the front surface of the trailer in the longitudinal direction, and wherein the cam cleat is located rearward of the line guard in the longitudinal direction.

14. A protective cover system for a trailer, comprising:
 a cover for covering a portion of the trailer, wherein the trailer has an upper surface and a vertical direction that extends from ground to the upper surface, wherein the trailer has a right surface and a left side surface and a lateral direction that extend from the right side surface to the left side surface, wherein the trailer has a longitudinal direction that extend from front surface of the trailer to a back of the trailer, wherein the front surface is oriented in a direction of travel of the trailer when the trailer is pulled; and
 a line, wherein the line moves relative to the trailer for moving the cover from a lowered position to a raised position, wherein when the cover is in the raised position a portion of the line is simultaneously:
 located above the upper surface of the trailer in the vertical direction,
 located rearward of the front surface of the trailer in the longitudinal direction, and
 located inboard of both the left and right side surfaces of the trailer in the lateral direction.

15. The protective cover system as set forth in claim 14, further comprising:
 a block that is attached to the trailer and that does not move relative to the trailer, wherein the block has a ring that is located outboard from the right side surface of the trailer in the lateral direction, wherein the line is disposed through the ring; and
 a guide member attached to the trailer, wherein the guide member is located outboard from the right side surface of the trailer in the lateral direction, wherein the line engages the guide member, wherein the guide member limits movement of the line forward in the longitudinal direction.

16. The protective cover system as set forth in claim 14, further comprising a line guard that is located outboard from the right side surface of the trailer in the lateral direction, wherein the line guard has a front surface that extends in the vertical direction and an outboard surface that extends in the vertical direction, wherein the line guard defines an open back, wherein the line is located in the line guard.

17. The protective cover system as set forth in claim 14, wherein the cover has an upper grommet, and further comprising an attachment member that attaches the line to the upper grommet to cause the line to be attached to the cover, wherein the attachment member and the upper grommet are both located above the upper surface of the trailer in the vertical direction and are both located rearward of the front surface of the trailer in the longitudinal direction.

18. The protective cover system as set forth in claim 14, further comprising a cam cleat through which the line is disposed, wherein the line moves downward in the vertical direction through the cam cleat but is prevented from moving upwards in the vertical direction through the cam cleat, wherein movement of the line in a direction tangential to the vertical direction causes the line to be removed from the cam cleat.

19. The protective cover system as set forth in claim 14, wherein the cover is a flexible member that is bunched up when in the lowered position and that is not bunched up when in the raised position, wherein the cover has indicia located on a front surface of the cover, wherein the cover has an extension portion that is located at the top of the cover and is spaced from both of the sides of the cover such that rectangular cut out portions are located proximate to the upper corners of the cover.

20. The protective cover as set forth in claim 14,
 wherein the different portion of the line that is located simultaneously:
 higher than the upper surface of the trailer in the vertical direction,
 inboard of both the right and left side surfaces in the lateral direction, and
 rearward of the front surface of the trailer in the longitudinal direction is an attachment member that is attached to the cover.

* * * * *